United States Patent [19]

Preiser

[11] Patent Number: 4,858,371
[45] Date of Patent: * Aug. 22, 1989

[54] RETRACTABLE BARBLESS FISHHOOK

[76] Inventor: Herbert W. Preiser, 510 Oak Knoll, Barrington, Ill. 60010

[*] Notice: The portion of the term of this patent subsequent to Sep. 6, 2005 has been disclaimed.

[21] Appl. No.: 234,576

[22] Filed: Aug. 17, 1988

Related U.S. Application Data

[63] Continuation of Ser. No. 143,001, Jan. 12, 1988, Pat. No. 4,768,304.

[51] Int. Cl.⁴ .............................................. A01K 83/00
[52] U.S. Cl. ................................................... 43/43.16
[58] Field of Search .................... 43/42.7, 43.16, 17.2, 43/44.8, 53.5

[56] References Cited

U.S. PATENT DOCUMENTS

| | | | |
|---|---|---|---|
| 620,896 | 3/1899 | Edgar | 43/43.16 |
| 2,796,605 | 6/1957 | Ashley | 43/43.16 |
| 3,027,676 | 4/1962 | Buttemeier | 43/43.16 |
| 3,768,195 | 10/1973 | Proietti | 43/43.16 |
| 4,028,838 | 6/1977 | Flower | 43/43.16 |
| 4,118,883 | 10/1978 | Watkins | 43/43.16 |
| 4,543,742 | 10/1985 | Rand | 43/43.16 |

*Primary Examiner*—M. Jordan
*Attorney, Agent, or Firm*—Wallenstein, Wagner & Hattis, Ltd.

[57] ABSTRACT

The terminal tackle device of the present invention generally includes a body portion being open at each end and having an internal longitudinal channel connecting each end. The body portion has outer dimensions larger than the inner dimensions of the terminal guide of a fishing rod. A barbless bend segment is fully retractable within one end of the body portion. An end of the bend segment carries a sharpened point and an other end of the bend segment is linked to a flexible shank which is slidably movable within the longitudinal channel of the body portion. The shank is of sufficient length so that an eye carried at an other end of the shank extends outside of and from an other end of the body portion. A biasing element is carried within the longitudinal channel of the body portion and surrounds a portion of the shank to return the bend segment, after retraction, to a fully extended position.

8 Claims, 1 Drawing Sheet

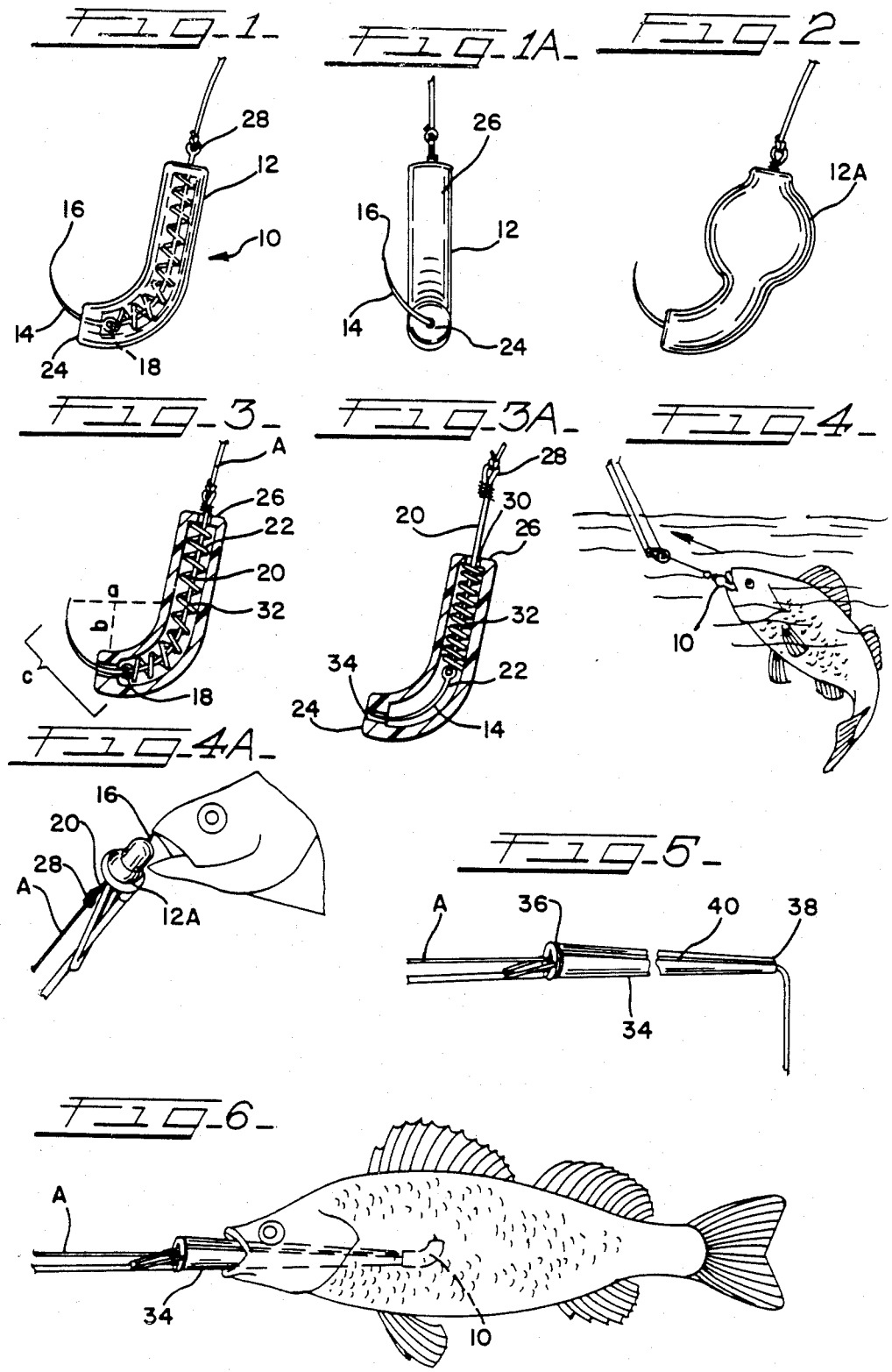

RETRACTABLE BARBLESS FISHHOOK

DESCRIPTION

This application is a continuation of application Ser. No. 143,001, filed Jan. 12, 1988, issued Sept. 6, 1988 as U.S. Pat. No. 4,768,304.

1. Technical Field of the Invention

The present invention generally relates to barbless fishhooks and other devices for practicing "catch-and-release" conservation techniques for sport fishing and, in particular, to a novel terminal tackle device embodying a retractable barbless fishhook relating thereto.

2. Background Art

Recently, sport fishing has placed a greater emphasis on the use of conservation techniques to preserve and enhance the quality of a fishery in order to perpetuate enjoyment of the sport. Among the various techniques which have been employed on a voluntary basis or by law are daily bag limits, slot limits and minimum length limits. In addition, another technique which has gained increasing favor is "catch-and-release" in which an angler releases his catch unharmed soon after landing it. Catch-and-release fishing is urged where a sport fishery receives a high degree of fishing pressure and is even mandatory in some regulated localized waters, such as trout streams.

However, one of the deficiencies of practicing the catch-and-release technique is that it requires the angler to handle the fish in order to remove the embedded barb from the fish. Often, when handling a fish, the angler may damage sensitive gill tissue or inadvertently remove a portion of the slime coating that protects a fish from bacterial or fungal infections. Because of mishandling of hooked fish, it has been estimated that nearly one-half of the fish released either die or are sufficiently weakened to become the subject of predation.

To enhance immediate release and minimize traumatic handling of the fish, barbless fishhooks, hooks with retractable barbs and other forms of terminal tackle have been proposed. Unfortunately, because of the curvature in even a barbless hook, it remains necessary to remove the fish from the water and handle it to some extent to effect hook removal. In instances where the fish is gullet hooked, rather than merely lip hooked, removal of the hook by handling of the fish is mandatory with greatly increased fish mortality.

Therefore, prior to the present invention, a need existed for a terminal tackle device which would allow removal of a hook from a fish without handling the fish. In addition, a need also existed for a terminal tackle device which would facilitate removal of the hook from the fish without withdrawing the fish from the water. A need further existed for accomplishing the foregoing objectives for gullet hooked fish.

SUMMARY OF THE INVENTION

According to the present invention, a terminal tackle device has been developed embodying a retractable barbless fishhook for removal of a hook from a landed fish without physically handling the fish and in some instances without withdrawing the fish from the water. The present invention is to be used in combination with a fishing rod, having at least one terminal guide, which carries a retrievable fishing line. The terminal tackle device of the present invention generally includes a body portion being open at each end and having an internal longitudinal channel connecting each end. The body portion has outer dimensions larger than the inner dimensions of the terminal guide of the fishing rod.

A barbless bend segment is fully retractable within one end of the body portion. An end of the bend segment carries a sharpened point for fish hooking purposes. An other end of the bend segment is linked to a flexible shank which is slidably movable within the longitudinal channel of the body portion. The shank controls retraction of the bend segment. The shank is of sufficient length so that an eye carried at an other end of the shank extends outside of and from an other end of the body portion.

Finally, a biasing element is carried within the longitudinal channel of the body portion and surrounds a portion of the shank. The biasing element acts upon the shank to return the bend segment, after retraction, to a fully extended position.

The terminal tackle device of the present invention operates in the following manner. When a fish has been hooked on the terminal point of the bend segment, an angler begins to retrieve the hooked fish. The angler directs the tip of the fishing rod and the terminal guide thereon toward the fish. Preferably, the terminal guide is partially submerged in the water. Retrieval continues until the body portion of the device abuts against the terminal guide of the fishing rod. By continuing retrieval, sufficient tension is created in the fishing line to overcome the biasing element, thereby pulling the shank from the body portion and causing a full retraction of the bend segment into the body portion. As a result of the retraction of the bend segment, the barbless point is withdrawn from the fish, thereby effecting a release of the fish without handling by the angler and preferably, without removing the fish from the water. Upon release of the fish, the angler stops the retrieving action and slackens the fishing line. This allows the biasing element to act on the shank to return the bend segment to a fully extended position.

In another embodiment of the present invention, a tapered sleeve having a longitudinal slit extending from end to end of the sleeve is used to remove the present invention from gullet hooked fish. Generally, the fishing line is drawn into the sleeve through the slit. A wider end of sleeve is then inserted onto the terminal guide of the fishing rod. The gullet hooked fish is retrieved to such a point that a narrower end of the sleeve inserts into the mouth of the fish and partially into the gullet. With further retrieval action, tension is created in the fishing line to effect a retraction and withdrawal of the point of the bend segment in a manner indicated above.

Other advantages and aspects of the invention will become apparent upon making reference to the specification, claims, and drawings to follow.

BRIEF DESCRIPTION OF DRAWINGS

FIG. 1 discloses in perspective view one embodiment of the present invention;

FIG. 1A is an end perspective view of the embodiment disclosed in FIG. 1;

FIG. 2 is another embodiment of the present invention;

FIG. 3 is a partial vertical section of the FIG. 1 embodiment showing the bend segment in a fully extended position;

FIG. 3A is the same view as FIG. 3 disclosing the bend segment in a fully retracted position;

FIG. 4 illustrates the retrieval of a fish, lip-hooked with the present invention;

FIG. 4A illustrates the abutment of the body portion of the fish against a terminal guide of the fishing rod and retraction of the bend segment from the fish;

FIG. 5 discloses another embodiment of the present invention utilizing a tapered sleeve attachment for gullet hooked fish; and, FIG. 6 illustrates the use of the tapered sleeve attachment disclosed in FIG. 5.

DETAILED DESCRIPTION OF THE INVENTION

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to embodiment illustrated.

Referring now to the drawings, FIG. 1 discloses one embodiment of a terminal tackle device 10 for releasing hooked fish without handling of the fish and preferably without removing the fish from water. Device 10 is comprised of a body portion 12, which as shown in FIGS. 1 and 2, may embody a tubular, J-shape. Body 12 may be made from a material which imparts buoyancy, such as a floating jig or may be weighted to sink, similar to a bottom-running jig or lead head jig. FIGS. 1 and 1A disclose that body 12 can be transparent to reveal the internal mechanism of device 10 or could be colored or dressed in any one of a number of fish attracting shades, hues, hackles and skirts. FIG. 2 discloses an alternative embodiment of body 12 taking the form of a typical oval or round shaped jig body 12A.

Device 10 further includes a bend segment 14 common to fishhook constructions. Bend segment 14 terminates at one end in a sharpened point 16 to provide device 10 with hooking capability. In order to effect a "hands off" release of hooked fish, point 16 is barbless. However, to provide sufficient hooking power, point 16 must be extremely sharp. Hence, it has been found that bend segment 14 is most effective when made from a portion of a surgical needle. To further increase fish hooking power, bend segment 14 may be obliquely angled in the manner disclosed in FIG. 1A.

As disclosed in FIG. 3 and using terminology from fishhook construction, the gap "a" defined between point 16 and body 12 approximates that of a common fishhook as does also the throat or bite "b". However, the length "c" of bend segment 14 is only about ½ that of a customary fishhook construction as a portion of the body 12 itself contributes to the hooked shape.

As best disclosed in FIGS. 3 and 3A, bend segment 14 is joined by a link 18 to a flexible shank 20. In one embodiment of the present invention, a portion of shank 20 is slidably movable within a longitudinal channel 22 within body 12. Channel 22 may extend from about a first end 24 of body 12 to a second end 26 or may take the form of a channel of more limited size within body 12. Shank 20 should be of sufficient length so that an eye 28 extends out of body 12 at second end 26. A fishing line or fishing leader "A" may be fastened directly to a loop 28 in the manner shown. An opening 30 at second end 26 of body 12 should be sufficiently dimensioned to permit unrestricted slidable movement of shank 20 but should be minimally dimensioned to prevent sand or other debris from entering longitudinal channel 22.

A biasing element, preferably a coil spring 32 is carried within channel 22 and spirally wound about shank 20. One end of spring 32 is engaged with link 18 and an other end of spring 32 abuts against inner surfaces surrounding opening 30. Spring 32 is essential to the operation of device 10 as will be explained below.

As revealed in FIGS. 3 and 3A, bend segment 14 is fully retractable within body 12 through an opening 34 in the first end 24 of body 12. Like opening 30, opening 34 should be of minimal dimension to allow for retraction of bend segment 14 yet prevent entry of debris into longitudinal channel 22. When shank 20 is drawn upon by tension created in a fishing line or leader "A" fastened to eye 28, bend segment 14 is retracted. During the retraction operation, spring 32 becomes compressed so that when the fishing line becomes slackened, spring 32 recoils to return bend segment 14 to a fully extended position. The amount of tension in spring 32 will depend upon the desired lure size of device 10, the strength and aggressiveness of the species of game fish being pursued as well as other factors.

FIGS. 4 and 4A illustrate the manner of using device 10 in releasing a lip hooked fish. An angler retrieves the hooked fish in a customary manner. As disclosed in FIG. 4, toward the end of the retrieve, the angler partially submerges the fishing rod tip and directs the tip at the hooked fish and continues the retrieve until the body 12 of device 10 abuts against the first guide of the fishing rod. For heavier, more aggressive game fish species, it is important that the fish remain submerged in the water as the natural buoyancy of the fish in the water will assist removal of device 10 from the fish. The retrieve is gently continued in order to tense the fishing line. This tension gradually pulls the shank 20 from the body and causes a full retraction of the bend segment 14 into the thus removing the point 16 from the fish. By this process it is possible to remove the point of the bend segment from the fish and release it without handling the fish or removing it from the water.

FIG. 5 discloses an attachment to be used for gullet hooked fish which commonly occurs with panfish and other small game fish species which tend to "swallow" a hook. An elongated tapered sleeve 34 is provided with an open wider end 36 and a open narrower end 38. A longitudinal straight slit 40 joins ends 36 and 38. As an alternative to straight slit 40, a helical slit may be employed. The function of slit 40 is to allow an angler to insert sleeve 34 over the fishing line A in the manner illustrated in FIG. 5. As shown in FIG. 5, the wider end 36 of sleeve 34 is secured against the terminal guide of the fishing rod.

As shown in FIG. 6 a gullet hooked fish is retrieved to such a point that the narrower end of the sleeve becomes inserted into the mouth of the fish and partially into the gullet. A gentle retrieve is continued until the body of the device abuts against the narrower end thereby initiating the bend segment retraction process in the manner indicated above.

Hence, by use of the present invention both lip hooked and gullet hooked fish can be safely released without handling and in many instances without removing the fish from water.

While the specific embodiments have been illustrated and described, numerous modifications come to mind without significantly departing from the spirit of the invention and the scope of protection is only limited by the scope of the accompanying claims.

I claim:

1. A terminal tackle sport fishing device for releasing a hooked fish without handling the fish, the device being used in combination with a fishing rod having at least one guide at a terminal end thereof, the rod carrying a retrievable fishing line, the one guide of the rod having an inner dimension to permit passage of at least the fishing line, the device comprising in combination:

- a body portion having outer dimensions generally larger than the inner dimension of the one guide of the fishing rod, the body portion also having an internal channel extending from one open end of the body portion to an other open end of the body portion;
- a barbless bend segment, one end of the bend segment having a sharpened terminal point, the bend segment being generally retractable into the channel of the body portion through the one open end of the body portion;
- a shank, one end of the shank acting upon the bend segment, an other end of the shank having means for connecting to the fishing line, the shank slidably movable within the channel of the body portion, the shank having a length such that the means for connecting to the fishing line extends outside of and from the other open end of the body portion; and
- a biasing element surrounding the shank so as to bias the slidable movement of the shank against the bend segment;
- wherein upon by hooking and landing a fish with said device the fish is retrieved until means for connecting to the fishing line shank passes through the guide and the body portion abuts against the guide, further retrieval of the fishing line causes the shank to substantially retract the bend segment into the body portion thereby withdrawing the point of the bend segment from the fish effecting a release of the fish.

2. The device of claim 1 wherein the body portion has a generally tubular configuration.

3. The device of claim 1 wherein the body portion has an enlarged jig-type lure configuration.

4. The device of claims 2 or 3 wherein the body portion is weighted to eliminate water buoyancy thereby causing the device to sink.

5. The device of claims 2 or 3 wherein the body portion is made from a material to achieve water buoyancy.

6. The device of claim 1 wherein the bend segment has a length about one-half the length of a bend of a fishhook.

7. The device of claim 1 further including:
- a tapered sleeve being open at each end, the sleeve having a longitudinal slit extending to each end, the slit permitting the fishing line to be inserted into the sleeve, such that upon landing a gullet hooked fish, the sleeve is positioned over the fishing line with a wider end of the sleeve abutting against the one guide of the fishing rod, the device and the hooked fish are retrieved so that a narrower end of the sleeve passes through the mouth of the fish and into the fish gullet until the body portion abuts against the narrower end of the sleeve, further retrieval causes the shank to retract the bend segment into the body portion thereby withdrawing the point from within the fish effecting a release of the fish.

8. The device of claim 1 wherein the means for connecting to the fishing line includes an eyelet.

* * * * *